UNITED STATES PATENT OFFICE.

EARL S. BISHOP, OF PITTSBURGH, PENNSYLVANIA, ASSIGNOR TO ARMOUR FERTILIZER WORKS, OF CHICAGO, ILLINOIS, A CORPORATION OF ILLINOIS.

TREATMENT OF PHOSPHATE-ROCK.

1,204,238.     Specification of Letters Patent.     Patented Nov. 7, 1916.

No Drawing. Application filed August 10, 1914, Serial No. 855,984. Renewed February 1, 1916. Serial No. 75,624.

*To all whom it may concern:*

Be it known that I, EARL S. BISHOP, a citizen of the United States, residing at No. 4179 Centre avenue, Pittsburgh, Allegheny county, State of Pennsylvania, have invented certain new and useful Improvements in Treatment of Phosphate-Rock; and I do hereby declare the following to be a full, clear, and exact description of the invention, such as will enable others skilled in the art to which it appertains to make and use the same.

The present invention relates to the treatment of rock containing tri-calcium phosphate and commonly known as phosphate rock for the purpose of rendering the insoluble tri-calcium phosphate available as a plant food, and is based upon the discovery that the insoluble tri-calcium phosphate contained in the rock may be so converted, when associated with a suitable proportion of silica by any chlorid which will form hydrochloric acid by reaction with silica in the presence of steam when the mixture is subjected to a sufficiently high temperature, in the presence of steam. According to the amount of chlorid employed, the resultant calcium phosphate product will be either citrate-soluble or water-soluble, that is to say, it will be either the di-calcium salt or the mono-calcium salt, as the case may be.

In the practice of the invention, the phosphate rock is ground to a fine state of subdivision, say to such a state of sub-division that its particles will pass through an 80 mesh screen. It is also preferable to grind with the rock the silica to be added, in order to obtain as homogeneous a mixture as possible, it being understood, in this connection, that the silica may be supplied in whole or in part from the silica content of the rock, which will suffice, in some instances, to obviate the necessity of adding a supplemental supply of silica. So, also, the particular chlorid selected may likewise be ground together with the rock and silica, but, in most cases, it will be preferable to dissolve the chlorid in water and to add the chlorid solution thus obtained, to the ground mixture of rock and silica, so that the mixture will be correspondingly moistened, thereby lessening the tendency to "dusting" in the rotary kiln in which the mixture is to be subsequently heated.

As a typical instance of the practice of the invention, it may be assumed that the chlorid selected, for initiating the operation, is potassium chlorid, and that with 100 parts by weight of the phosphate rock are associated 20 parts by weight of potassium chlorid and 5 parts by weight of silica (in addition to the silica present in the rock, which is usually as high as at least 15% by weight). In fact, the mixture should be so compounded, that there shall be a sufficient excess of silica present to insure, in the presence of steam, the conversion of all of the chlorid into a silicate and hydrochloric acid. It will, of course, be understood, as hereinbefore indicated, that, should the proportion of silica naturally present in the rock be sufficient to amply supply the desired excess, it will be unnecessary to supplement it by any further addition; in general, however, the rock will not contain a sufficient quantity of silica for the purpose. The ground mixture of phosphate rock, silica, and chlorid (the latter having preferably been added in solution in water, in order to moisten the mass) is then fed into a rotary inclined kiln, of the general type familiarly employed in the calcining of cement; that is to say, a kiln which may conveniently have an internal diameter of say 8 ft. and a length of say 160 ft., and internally fired. The mixture to be treated is supplied to the kiln at its upper end, and the kiln is heated by the combustion of fuel, such as gas, oil or powdered coal, supplied by an adequate air and gas-injecting burner, projected through the customary stationary hood at the lower end of the kiln,—the usual provision being made for the discharge of the treated material at the lower or exit end of the kiln into a collecting pit, through which and elsewhere in and about the hood enters a sufficient quantity of secondary air to obtain practically complete combustion of the fuel. The kiln is likewise provided with a series of longitudinal shelves extending from end to end thereof in its interior and whose function is to lift the material as it passes through the kiln and to drop it through the gaseous products of combustion.

The temperature prevailing in the kiln will, of course, diminish from its lower zone toward the stack end. As a general rule, care should be taken to maintain the temperature below the sintering temperature of the mass, so that when the product issues from the kiln, it will be in a loosely friable condition. This is of particular importance for the reason that, should the temperature rise to such a degree that the product would clinker, the expense of subsequently grinding it to the desired 80 mesh fineness which is particularly appropriate to its use would be very considerably increased. Steam, preferably superheated, is likewise admitted through a pipe located alongside of or immediately beneath or above the gas and air burner, so that the steam joins the gaseous products of combustion and with them passes upward through the kiln, and is thus brought in contact with the incoming rock mixture.

In those instances where it is desired to obtain a citrate-soluble product, the operation may be expressed in terms of the following equation:—

(1). $Ca_3(PO_4)_2 + 2SiO_2 + 2KCl + 2H_2O \rightarrow Ca_2H_2(PO_4)_2 + 2HCl + K_2SiO_3 + CaSiO_3$.

In this product, it will be noted that in addition to the citrate-soluble dicalcium salt, there is obtained potassium silicate, which is itself immediately available as a plant food, and also calcium silicate, which will likewise eventually break down and supply a fertilizing ingredient to the soil. Particularly, however, it will be noted, that the reaction supplies a quantity of hydrochloric acid, which is made available, thereafter, in the further practice of the invention. To this end, the hydrochloric acid vapors may be absorbed in water supplied to the top of a tower and which trickles down in counter-flow to the uprising products of combustion coming from the kiln and which contain the hydrochloric acid vapors; whereupon, the solution of hydrochloric acid thus obtained may be added to the next succeeding batch of ground rock and silica supplied to the kiln, in lieu of supplying such batch with a solution of chlorid. Or, preferably, the hydrochloric acid vapors are absorbed directly in the intended fresh batch of ground rock and silica, by conveying the vapors into contact with the proposed fresh batch or charge in a suitable tower or other receptacle provided for that purpose. In either case, the operation may proceed for the conversion of fresh charges or batches of ground rock and silica, it being only necessary to supply, from time to time, such additional quantity of chlorid as may be necessary to make up mechanical losses of hydrochloric acid. Thus the hydrochloric acid supplied to the fresh batch or charge of ground rock and silica, outside the furnace, will convert a portion of the rock into citrate-soluble form, with the simultaneous production of calcium chlorid, according to the following equation:—

(2). $Ca_3(PO_4)_2 + 2HCl \rightarrow Ca_2H_2(PO_4)_2 + CaCl_2$.

Thereupon, when this product is subjected to treatment in the rotary kiln, the conversion of the remainder of the rock into a citrate-soluble form will proceed in accordance with the following equation:—

(3). $Ca_3(PO_4)_2 + CaCl_2 + 2SiO_2 + 2H_2O \rightarrow Ca_2H_2(PO_4)_2 + 2CaSiO_3 + 2HCl$.

It will thus be noted, that in the furnace, the hydrochloric acid is regenerated and is therefore again available in the treatment of the next succeeding batch or charge of ground rock and silica; and so on, mechanical losses of hydrochloric acid being supplied, as will occur from time to time.

In those instances, where it is desirable to produce a product which gives an alkaline reaction (as, for instance, where it is to be employed on acid soils), a corresponding quantity of an alkali metal chlorid may be added to each batch treated so as to supply the desired quantity of alkali for the particular use intended, and, of course, in this connection, it is to be noted that the initial operation represented by equation (1), gives a product having an alkaline reaction and is itself representative of the capabilities of the process in this regard. In all cases, the product is non-acid with respect to litmus and other common indicators and will not injure the hands of the user and will not rot the bags in which it is contained, and it is likewise not hygroscopic to any marked degree.

Whenever it is desired to produce the mono-calcium or water-soluble salt, this may be accomplished by proportionately increasing the quantity of chlorid and of silica, according to the following typical reaction:

(4). $Ca_3(PO_4)_2 + 4SiO_2 + 4KCl + 4H_2O \rightarrow CaH_4(PO_4)_2 + 4HCl + 2CaSiO_3 + 2K_2SiO_3$.

It will be noted that, in this latter instance, the amount of hydrochloric acid produced, is likewise double, and, consequently, that there is a proportionately larger possible factor of mechanical loss in hydrochloric acid during the succeeding operations, in addition to the initial increased cost of the chlorid employed. Nevertheless, for some uses and to supply certain demands, it is desirable to have the product in water-soluble form, and this is readily accomplished by the present process.

Referring generally to the process hereinbefore described, it may be further noted that there is special advantage in absorbing the hydrochloric acid vapors within the fresh batch of ground rock and silica, for the reason that it is found that in such case, the batch is agglomerated into lumps varying in size from about the size of a pea to about the size of an egg, when it is withdrawn from the absorption tower or receptacle, and, in this form, it is less liable to dusting than otherwise. It may also be further pointed out as an advantage of maintaining the temperature of the kiln below the sintering temperature for the material treated that by so doing the amount of phosphoric acid vaporized from the kiln is considerably diminished. Such minor portion as may be driven off at a temperature below the sintering heat is, moreover, readily caught and recovered in the fresh batch of ground rock and silica and is thereafter returned with it into the process.

It will be further understood that any losses of hydrochloric acid may, of course, be supplied by corresponding additions of hydrochloric acid but without the advantage in cheapness which is incident to supplying such loss by the addition of chlorids.

What I claim is:

1. The method of making phosphate rock available for plant food, which comprises subjecting to a sufficiently high temperature, in the presence of steam, a mixture of the rock with a suitable metal chlorid and an excess of silica sufficient to combine with the metal of the chlorid and with part of the calcium of the phosphate rock; substantially as described.

2. The method of making phosphate rock available for plant food, which comprises subjecting to a sufficiently high temperature, in the presence of steam, a mixture of the rock with a chlorid of a strong base and an excess of silica sufficient to combine with the metal of the chlorid and with part of the calcium of the phosphate rock; substantially as described.

3. The method of making phosphate rock available for plant food, which comprises subjecting to a sufficiently high temperature, in the presence of steam, a mixture of the rock with an alkali metal chlorid and an excess of silica sufficient to combine with the metal of the chlorid and with part of the calcium of the phosphate rock; substantially as described.

4. The method of making phosphate rock available for plant food, which comprises subjecting to a sufficiently high temperature, in the presence of steam, a mixture of the rock with a metal chlorid and an excess of silica sufficient to combine with the metal of the chlorid and with part of the calcium of the phosphate rock, the temperature being maintained below that which would sinter the product; substantially as described.

5. The method of making phosphate rock available for plant food, which comprises subjecting to a sufficiently high temperature, in the presence of steam, a mixture of the rock with a metal chlorid and an excess of silica sufficient to combine with the metal of the chlorid and with part of the calcium of the phosphate rock, and recovering the hydrochloric acid given off during the operation in a fresh batch of the mixture; substantially as described.

6. A fertilizer comprising calcium acid phosphate in a soluble and commercially available form, intimately associated with calcium silicate and an alkali silicate, said fertilizer resulting from the reaction upon phosphate rock at a high temperature of an alkali chlorid and a sufficient excess of silica to combine with the metal of the chlorid and part of the calcium of the phosphate rock, said fertilizer being free from uncombined acid, substantially non-hygroscopic, and having an alkaline reaction due to the alkali silicate; substantially as described.

7. A fertilizer comprising calcium acid phosphate in a soluble and commercially available form, intimately associated with calcium silicate and sodium silicate, said fertilizer resulting from the reaction upon phosphate rock at a high temperature of sodium chlorid and a sufficient excess of silica to combine with the sodium of the chlorid and part of the calcium of the phosphate rock, said fertilizer being free from uncombined acid, substantially non-hygroscopic, and having an alkaline reaction due to the sodium silicate; substantially as described.

In testimony whereof I affix my signature, in presence of two witnesses.

EARL S. BISHOP.

Witnesses:
 KENNETH R. PENNIE,
 M. A. BILL.